(12) United States Patent
Huskey

(10) Patent No.: US 6,726,025 B1
(45) Date of Patent: Apr. 27, 2004

(54) PORTABLE SORTING SYSTEM AND METHOD FOR RECYCLABLE MATERIAL

(76) Inventor: Michael Huskey, 1690 Sheppard La., Makanda, IL (US) 62958

(*) Notice: Subject to any disclaimer, the term of this patent is extended or adjusted under 35 U.S.C. 154(b) by 65 days.

(21) Appl. No.: 10/090,604

(22) Filed: Mar. 4, 2002

(51) Int. Cl.[7] .................................................. B07C 5/02
(52) U.S. Cl. ...................... 209/421; 209/420; 209/930; 209/931; 209/630
(58) Field of Search ............................ 209/930, 931, 209/630, 632, 703, 420, 421

(56) References Cited

U.S. PATENT DOCUMENTS

| | | | | |
|---|---|---|---|---|
| 4,227,997 A | * | 10/1980 | Shaddock | 209/250 |
| 5,100,537 A | * | 3/1992 | Krause | 209/2 |
| 5,116,486 A | * | 5/1992 | Pederson | 209/31 |
| 5,234,564 A | * | 8/1993 | Smith | 209/241 |
| 5,244,220 A | | 9/1993 | Cortez | |
| 5,411,147 A | * | 5/1995 | Bond | 209/44.4 |
| 5,577,618 A | * | 11/1996 | Rafferty | 209/421 |
| 5,611,270 A | | 3/1997 | Harrington | |
| 6,152,308 A | * | 11/2000 | Kreiser et al. | 209/421 |
| 6,382,425 B1 | * | 5/2002 | Brickner et al. | 209/421 |
| 6,405,874 B1 | * | 6/2002 | Douglas | 209/421 |

OTHER PUBLICATIONS

"Sorting Through the Best Equipment for Recyclables" MSW Management, Forester Communications, Inc., 1991–2001.
"Magnetic Equpement Guide—Eddy Current Separators", Recycling today, Alloy Analyzers Thermo Measure Tech, Aug. 12, 2001; GIE Media, Inc. 1997–2002.
"Providing Plastic Separation Solutions" Butler–MacDonald, Inc.

* cited by examiner

Primary Examiner—Donald P. Walsh
Assistant Examiner—Jonathan R Miller
(74) Attorney, Agent, or Firm—McKee, Voorhees & Sease, P.L.C.

(57) ABSTRACT

A system and method for sorting recyclable materials is portable, modular, and easy to install and/or remove. Generally, a variety of sorting equipment is placed upon a portable platform that may be loaded or unloaded from a roll-off truck. When at the desired location, the portable platform may be removed and the sorting equipment set up for use. The sorting equipment may include an infeed conveyor, a sorting conveyor, and a variety of automatic sorting equipment such as an aluminum blower, a magnet separator, and an eddy-current separator. The platform may be simply placed on the floor or ground at the desired location or it may be elevated by a plurality of supports.

21 Claims, 5 Drawing Sheets

PORTABLE SORTING SYSTEM AND METHOD FOR RECYCLABLE MATERIAL

BACKGROUND OF THE INVENTION

1. Field of the Invention

The present invention relates generally to a method and apparatus for sorting recyclable materials. More particularly, though not exclusively, the present invention relates to a method and apparatus for a sorting system for recyclable materials that is easily transportable to a variety of locations.

2. Problems in the Art

Currently, a wide variety of sorting equipment exists in the recycling industry. This equipment is used to separate all kinds of recyclable materials including glass, plastics, paper, metals, and even fibrous materials. Sorting equipment tends to be expensive and large, using a great deal of space. The great investments required in both equipment and real estate have led to development of dedicated material recovery facilities (MRFs) in which the equipment can be permanently installed.

Permanent installation also requires transporting recyclable materials to the MRF for sorting. MRFs usually have to rely on a steady flow of materials from outside sources. If a majority of the material comes from only a few locations, it may be more advantageous to bring the recycling equipment to the location itself. However, current recycling equipment is not readily portable and requires dedicated facilities for effective use. Using only the equipment needed for the desired job at the best location will save money, time and resources. There is therefore a need for recycling equipment which can be easily transported from one location to another.

Further, labor can be a substantial cost associated with recycling. Depending on the type and volume of recyclables to be sorted, economics may favor either manual or automatic sorting. It is therefore desirable to have a system for sorting recyclables that is easily configurable to manual and/or automatic sorting methods.

3. Features of the Invention

A general feature of the present invention is the provision of a portable sorting system and method for recyclable materials which overcomes the problems found in the prior art.

A further feature of the present invention is the provision of a portable sorting system and method for recyclable materials that offer a wide variety of recycling equipment.

A further feature of the present invention is the provision of a portable sorting system and method which is adaptable for the recycling task at hand.

Another feature of the present invention is the provision of a portable sorting system and method which is modular in design.

Yet another feature of the present invention is the provision of a portable sorting system and method which may be configured for manual and/or automatic sorting of recyclable material.

These, as well as other features and advantages of the present invention, will become apparent from the following specification and claims.

BRIEF SUMMARY OF THE INVENTION

The present invention generally comprises a system for sorting recyclable materials that is both portable and modular. In one embodiment, the sorting system of the present invention may include an infeed conveyor, a sorting conveyor, and a control panel all resting on a portable platform. A roll-off truck can be used to transport the portable platform to a desired location. The platform is typically no wider than an average road allows. Upon arrival at the desired location, the platform can be rolled off the truck and all of the equipment moved into operating position. This may require the use of a forklift or other lifting equipment, but can typically be accomplished in an hour. Preferably, the system for sorting recyclable materials of the present invention includes several conveyors, and additional items such as manual and/or automated sorting equipment, including blowers, magnets, or eddy-current units. In this manner, manual and automatic sorting can be accomplished in the same system. Further, the system of the present invention may include several platforms operating together.

DETAILED DESCRIPTION OF THE INVENTION

The present invention will be described as it applies to several embodiment. It is not intended that the present invention be limited to the described embodiments. It is intended that the invention cover all modifications and alternatives which may be included within the spirit and scope of the invention.

Figure 1:
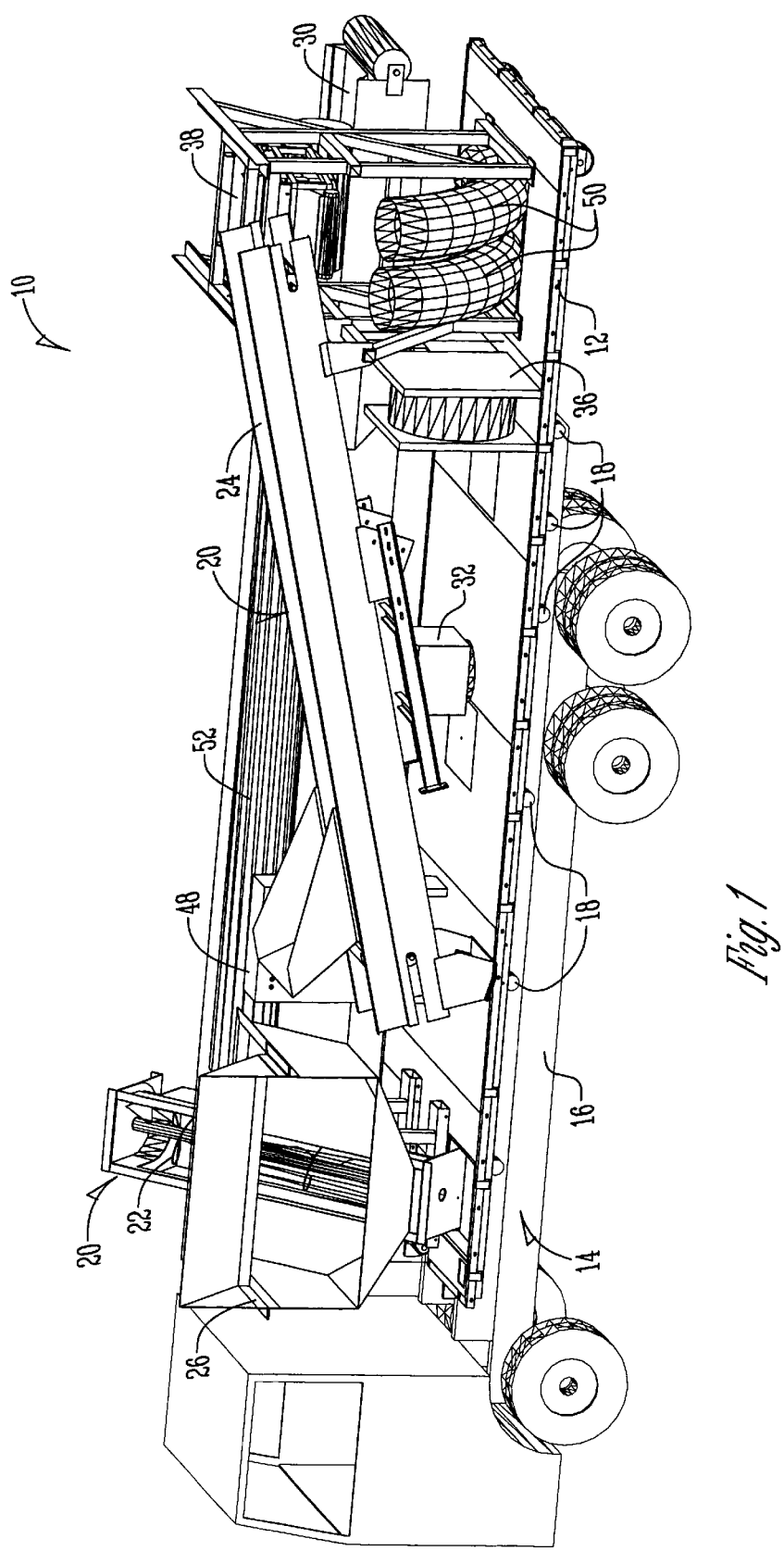
FIG. 1 is a perspective view of the portable sorting system for sorting recyclable materials of the present invention shown on a truck for transport.

As is shown in FIG. 1, the recycling system 10 of the present invention includes a wide variety of equipment which may be placed upon a platform 12 and transported to a desired location by a truck 14. Many platforms 12 may be used and operatively connected to perform any desired recycling task. Preferably, the truck 14 is a roll-off truck having a tiltable bed 16 with a plurality of rollers 18 thereon. This allows the platform 12 to be easily loaded and unloaded. The platform 12 may be of any desired width or length, but is preferably less than eight feet, six inches wide to allow for transport on the interstate highway system.

The equipment typically carried on the platform 12 will usually include some type of infeed 20, such as the auger conveyor 22 or the cleated incline conveyor 24. A hopper 26 may also be included to allow a user to dump large amounts of recyclable materials onto the infeed 20. A sort conveyor 30 is also on the platform 12. Additionally, the platform 12 may include such items as a plurality of sorting chutes 32, a blower machine 36 to sort aluminum products, a magnet separator 38 to sort ferrous materials, an eddy-current separator 40 to sort non-ferrous metals as well as a wide variety of arched 50 or straight 52 duct work. Any mechanical sorting units and all of the conveyors are wired to be centrally controlled at a control panel 48.

After determining what material is to be sorted and the right equipment for the job, the sorting system 10 of the present invention may be set up and installed. The sorting platform 12 is preferably rolled off of the truck 14. The platform 12 is placed at or near a desired location and the equipment contained thereon is preferably moved by forklift and set up for use. This involves minimal assembly, such as rotating parts into proper position, plugging various equipment in and bolting various parts together. Typically, it will only take one hour to set up each platform 12 and the equipment contained thereon.

Figure 2:
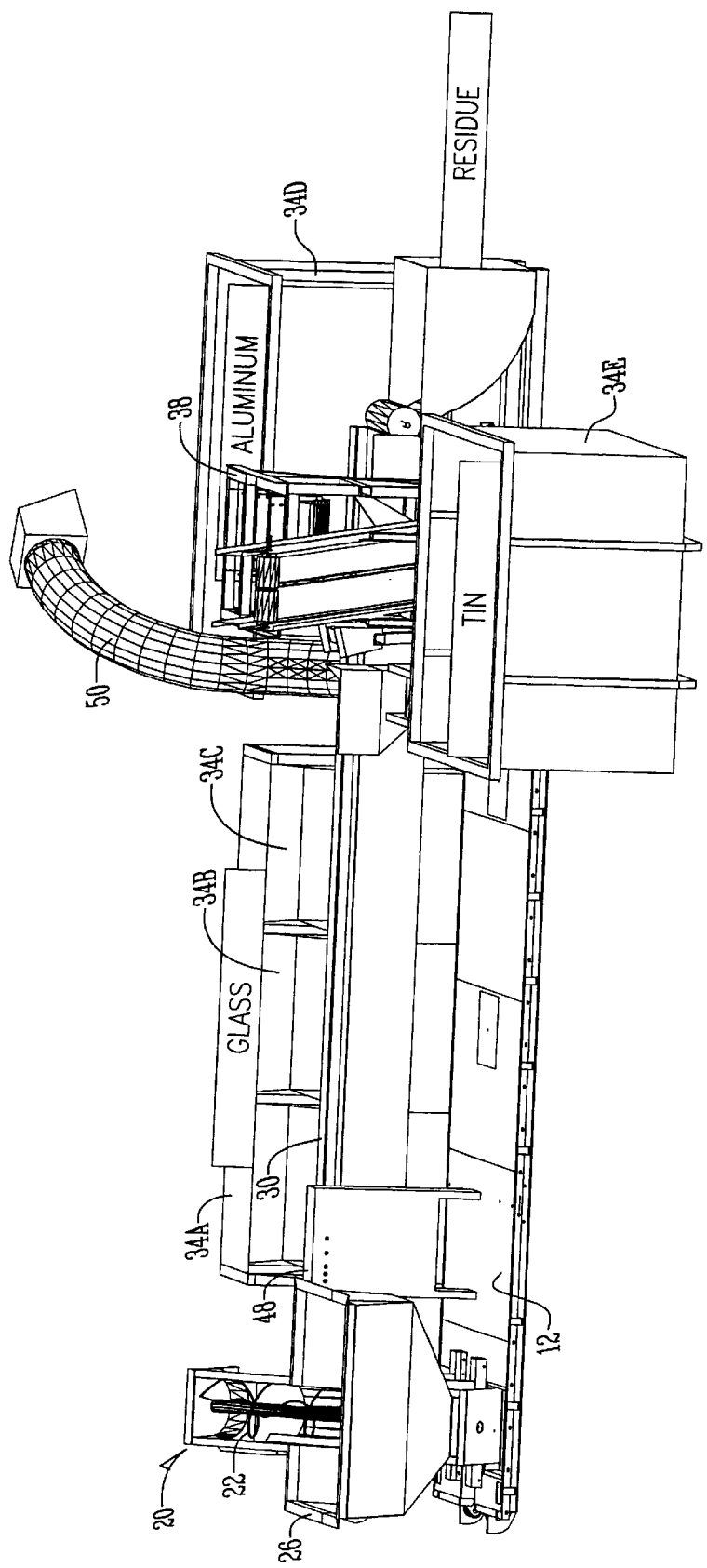
FIG. 2 is a perspective view of a first set up embodiment of the portable sorting system for sorting recyclable materials of the present invention set up for use.

FIGS. 2–5 show different set ups for system 10 to sort a wide variety of materials. In one embodiment, the system 10 shown in FIG. 2 is set up to sort aluminum, tin and glass from residue or waste products. Initially, all of the recyclable materials will be placed in the hopper 26. From there, the materials are carried up the auger conveyor 22 and placed on either another infeed 20 or the sorting conveyor 30. The sorting conveyor 30 preferably includes a changeable transition hopper to allow it to receive material from either end or the side. The sorting conveyor 30 may have a variable speed, customized length, and a stainless steel section for overhead magnet use.

On the sorting conveyor 30, a worker standing on the platform 12 may separate out glass products into the bins 34 labeled for glass. A plurality of glass bins 34A, B, C, may be included to separate glass into desired groups, such as green glass, colored glass, and clear glass. As the materials travel further down the sorting conveyor 30, an aluminum blower 36 may push separated aluminum products up the arched duct work 50 and into the bin 34D for aluminum. The duct work may be of any configuration. Preferably, the aluminum blower includes a 7.5 hp motor for longer transfer distances. Alternatively separated materials can be transferred to the bin 34A–E by a cleated conveyor. Additionally, the magnet separator 38 can pull out any ferrous materials such as tin which can then travel down additional duct work into the bin 34E for tin products. Remaining residue or waste materials simply fall off of the sorting conveyor for disposal. Of course, the system 10 of the present invention could also be used for negative sorting operations.

Figure 3:
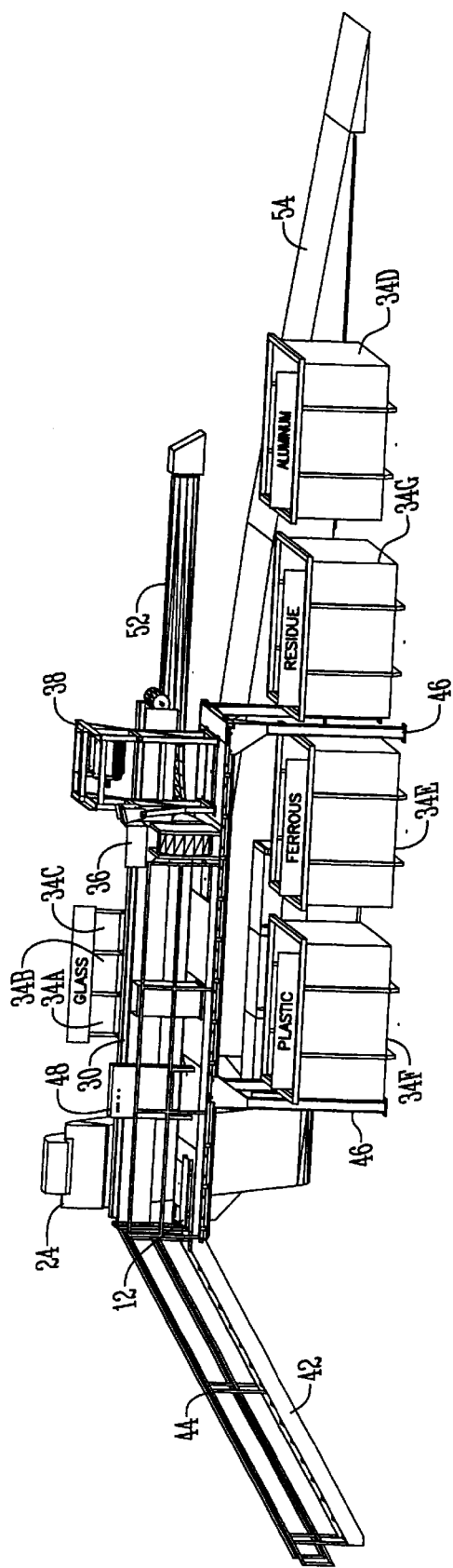
FIG. 3 is a perspective view of a second set up embodiment of the portable sorting system for sorting recyclable materials of the present invention.

Alternatively, the system 10 may be set up in the arrangement as shown in FIG. 3. In FIG. 3, stairs 42, handrails 44, and supports 46 are all transported on the platform 12 and installed on location. Here again, recyclable materials may be supplied via the direct feed ramp 54 to the cleated incline conveyor 24. From there, the materials are placed on the sorting conveyor 30. Here again, a worker may hand separate out glass or plastic into the appropriate bin 34A, B, C, F. A magnet separator 38 may also be included to sort out ferrous materials for deposit into bin 34E. The magnet separator 38 automatically separates ferrous materials from other materials. The magnet separator 38 preferably uses a self-cleaning permanent magnet and can be rotated or adjusted for discharge off either end of the sort conveyor 30. Here, residue materials may also be sorted into their own bin 34G. The platform 12 as shown in FIG. 3 is elevated by a plurality of supports or legs 46. Using the supports 46 allows for easy collection of residue and recyclable materials into larger bins 34D–G.

Figure 4:
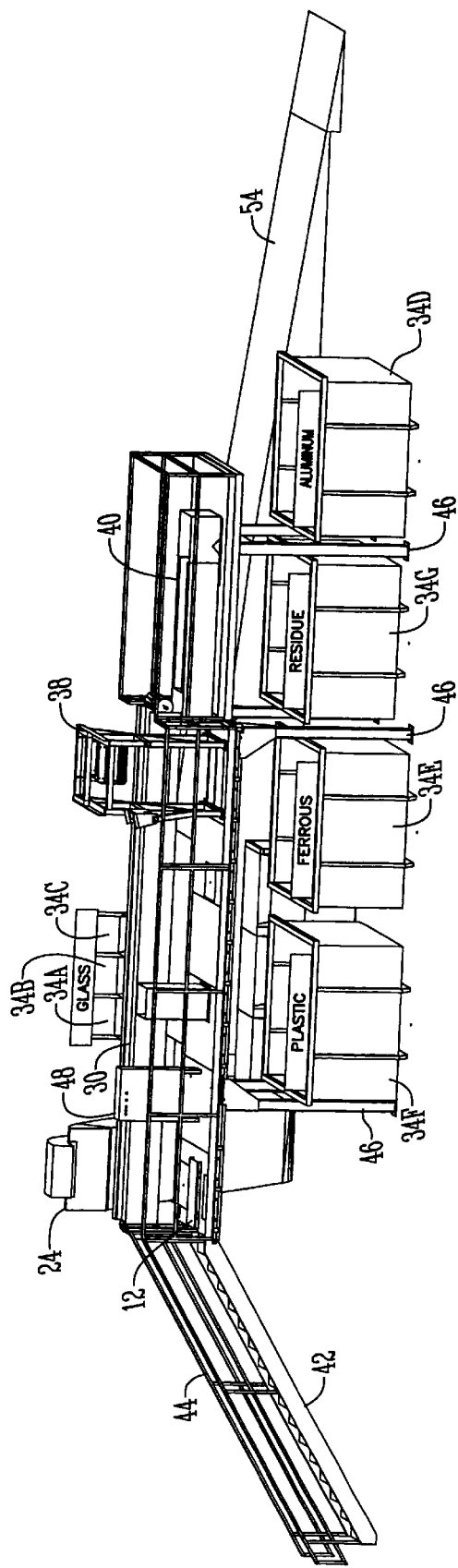
FIG. 4 is a perspective view of a third set up embodiment of the portable sorting system for sorting recyclable materials of the present invention.

As is shown in FIG. 4, the same system can also include an eddy-current separator 40. The eddy-current separator 40 separates aluminum from other materials. Any of the conveyor's magnet separators, eddy-current units or other powered equipment can either be stand-alone units or controlled by the control panel 48. The control panel 48 preferably connects to each component via twist-lock connectors. From the control panel 48, a user can operate a one button logical start up sequence and all add-on modules.

Figure 5:
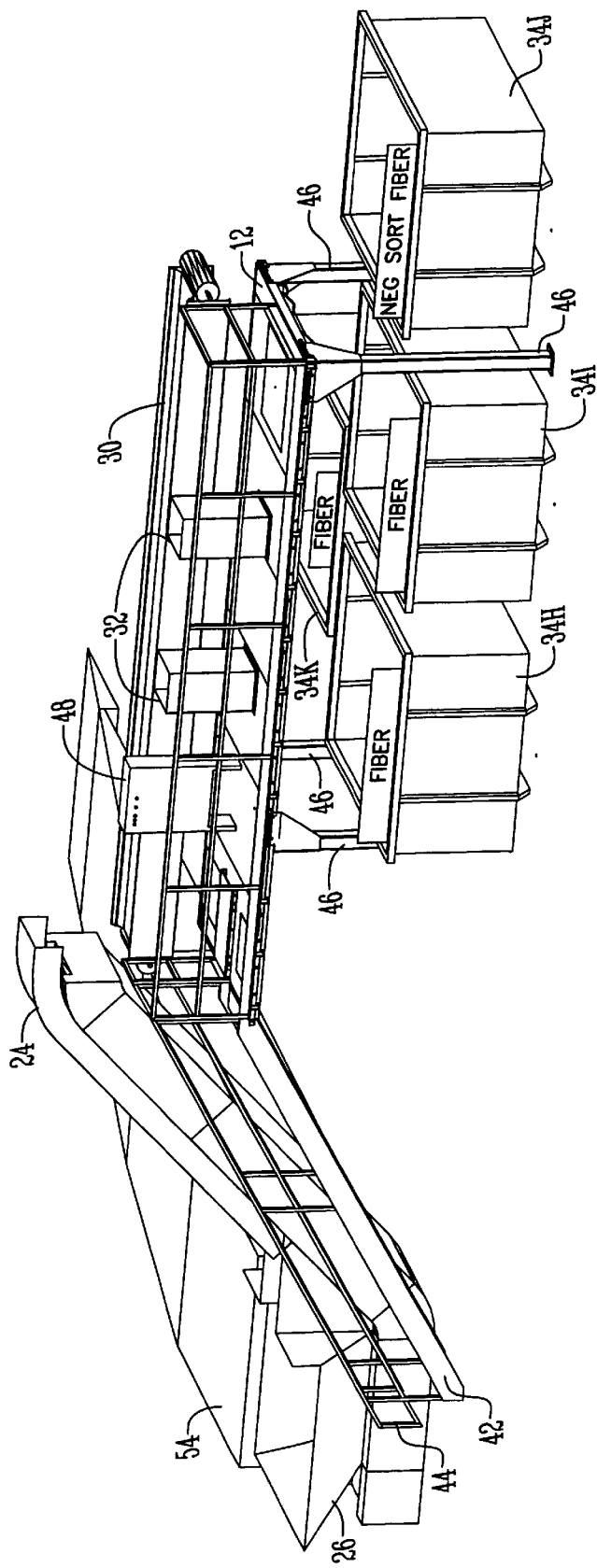
FIG. 5 is a perspective view of a fourth set up embodiment of the portable sorting system for sorting recyclable materials of the present invention.

As shown in FIG. 5, the system 10 of the present invention can also be arranged for sorting fibrous materials manually. Fibrous materials can be brought up the direct feed ramp 54, placed in the hopper 26 and raised to the sorting conveyor 30 by the cleated incline conveyor 24. On the sorting conveyor 30, workers can separate the fibrous materials into any desired grouping by placing the selected fibrous materials down specific sorting chutes or holes 32 where it will fall into the bins 34H, I. Waste materials can also be collected in another separate bin 34J.

Thus, all the recycling equipment is transported on the platform 12 and an operator selects which equipment to set up and use at each recycling site. The loaded platform 12 can be easily loaded to and from the tiltable bed 16 of the roll-off truck 14. The equipment is movable between a transport position on the platform 12 and a use position, which may be on or off the platform 12.

From the above, it should be clear that the system 10 of the present invention may be easily modified for the sorting task at hand. Further, because a wide variety of equipment may be placed upon the platform 12, the sorting system 10 of the present invention is easily modified to do the task at hand.

The general description of the present invention as well as the preferred embodiment of the present invention has been set forth above. Those skilled in the art to which the present invention pertains will recognize and be able to practice additional variations in the methods described which fall within the teachings of this invention. Accordingly, all such modifications and additions are deemed to be within the scope of the invention which is to be limited only by the claims appended hereto.

What is claimed is:

1. A method for sorting of recyclable material using a portable platform and recycling equipment including conveyors for moving recyclable material and material sorting devices, the method comprising:

placing the equipment into a transport position on the platform;

rolling the platform onto a roll-off vehicle for transport to a first recycling location;

rolling the platform from the roll-off vehicle at the first recycling location;

assembling the recycling equipment into an operative position;

sorting the recyclable material;

disassembling the recycling equipment;

placing the equipment in the transport position on the platform; and reloading the platform onto the vehicle for transport to a second recycling location.

2. The method of claim 1 further comprising supporting the platform above the ground when unloaded from the vehicle.

3. The method of claim 1 further comprising dumping recyclable materials into a hopper and sorting the recyclable materials.

4. The method of claim 1 further comprising operating the recycling equipment from a control panel.

5. The method of claim 1 farther comprising assembling a combination of equipment from the platform at each recycling location.

6. The method of claim 1 further comprising sorting recyclable material into bins.

7. A method for sorting recyclable materials, the method comprising:
- transporting a system for sorting recyclable materials to a desired location using a roll-off vehicle having a tiltable bed with a plurality of rollers, the system comprising a platform vehicle, a sorting conveyor and a plurality of sorting equipment on the platform;
- rolling the platform from the roll-off vehicle;
- choosing from the sorting equipment;
- setting up the chosen sorting equipment on the platform; and
- sorting recyclable materials into a plurality of bins using the sorting conveyor and sorting equipment.

8. The method of claim 7 further comprising supporting the platform above the ground when unloaded from the vehicle.

9. In combination with a roll-off truck having a tiltable bed with a plurality of rollers, a portable apparatus for sorting recyclable materials, the apparatus comprising:
- a platform rollable onto and off of the tiltable bed:
- a conveyor;
- a sorting device;
- a plurality of sorting receptacles;
- the conveyor and sorting device being movable between a transport position on the platform and a use position relative to the platform.

10. The apparatus for sorting recyclable materials of claim 9 wherein the sorting device is an aluminum blower.

11. The apparatus for sorting recyclable materials of claim 9 wherein the sorting device is a magnet separator.

12. The apparatus for sorting recyclable materials of claim 9 wherein the sorting device is an eddy-current separator.

13. The apparatus for sorting recyclable materials of claim 9 wherein the conveyor is an auger conveyor.

14. The apparatus for sorting recyclable materials of claim 9 wherein the conveyor is a cleated incline conveyor.

15. The apparatus for sorting recyclable materials of claim 9 wherein the platform is supported by a plurality of legs in the use position.

16. The apparatus for sorting recyclable materials of claim 9 further comprising a plurality of stairs leading to the platform in the use position.

17. The apparatus for sorting recyclable materials of claim 9 further comprising a control panel.

18. A portable sorting system that is transportable upon a vehicle with a tiltable bed having a plurality of rollers, the sorting system comprising:
- a platform rollably mountable to and removable from the tiltable bed;
- a plurality of conveyors moveable between a transport position an the platform and a use position;
- a plurality of sorting devices moveable between a transport position on the platform and a use position; and
- a plurality of collection bins.

19. The portable sorting system of claim 18 wherein the sorting devices includes an eddy current separator.

20. The portable sorting system of claim 18 wherein the sorting devices includes an aluminum blower.

21. The portable sorting system of claim 18 wherein the sorting devices includes a magnet separator.

* * * * *

UNITED STATES PATENT AND TRADEMARK OFFICE
CERTIFICATE OF CORRECTION

PATENT NO. : 6,726,025 B1
DATED : April 27, 2004
INVENTOR(S) : Huskey, Michael L.

It is certified that error appears in the above-identified patent and that said Letters Patent is hereby corrected as shown below:

<u>Column 4,</u>
Line 65, "farther" should read -- further --.

<u>Column 5,</u>
Line 22, delete ":" and insert -- ; --.

Signed and Sealed this

Thirtieth Day of May, 2006

JON W. DUDAS
*Director of the United States Patent and Trademark Office*